(12) United States Patent
Pagarkar et al.

(10) Patent No.: US 10,488,902 B2
(45) Date of Patent: Nov. 26, 2019

(54) DYNAMIC MULTI-CORE PROCESSOR VOLTAGE SCALING BASED ON ONLINE CORE COUNT

(71) Applicant: Qualcomm Innovation Center, Inc., San Diego, CA (US)

(72) Inventors: Sajjad Pagarkar, San Diego, CA (US); Karthik Ranganathan Vishwanathan, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 0 days.

(21) Appl. No.: 15/047,176

(22) Filed: Feb. 18, 2016

(65) Prior Publication Data

US 2016/0246343 A1 Aug. 25, 2016

Related U.S. Application Data

(60) Provisional application No. 62/119,716, filed on Feb. 23, 2015.

(51) Int. Cl.
*G06F 1/26* (2006.01)
*G06F 1/3287* (2019.01)
*G06F 1/3296* (2019.01)
*G06F 1/3234* (2019.01)
*G06F 9/50* (2006.01)
*G06F 1/324* (2019.01)
*G06F 1/3203* (2019.01)

(52) U.S. Cl.
CPC .............. *G06F 1/26* (2013.01); *G06F 1/3243* (2013.01); *G06F 1/3287* (2013.01); *G06F 1/3296* (2013.01); *G06F 9/5094* (2013.01); *G06F 1/3203* (2013.01); *G06F 1/324* (2013.01); *Y02D 10/152* (2018.01); *Y02D 10/171* (2018.01); *Y02D 10/172* (2018.01); *Y02D 10/22* (2018.01)

(58) Field of Classification Search
CPC ...... G06F 1/324; G06F 1/3203; G06F 1/3296; G06F 1/26; G06F 1/3243; G06F 1/3287; G06F 9/5094
See application file for complete search history.

(56) References Cited

U.S. PATENT DOCUMENTS

| 8,402,294 B2* | 3/2013 | Burton ....................... G06F 1/26 323/234 |
| 9,568,982 B1* | 2/2017 | Allen-Ware .......... G06F 1/3243 |
| 2014/0258760 A1* | 9/2014 | Wells .................... G06F 1/3206 713/330 |
| 2015/0006915 A1* | 1/2015 | Ganesan ................... G06F 1/26 713/300 |
| 2015/0277536 A1 | 10/2015 | Vanka et al. |
| 2016/0054782 A1* | 2/2016 | Kaburlasos ........... G06F 1/3234 713/320 |
| 2017/0031427 A1* | 2/2017 | Allen-Ware .......... G06F 1/3243 |

* cited by examiner

Primary Examiner — Terrell S Johnson
(74) Attorney, Agent, or Firm — Neugeboren O'Dowd PC

(57) ABSTRACT

A device and method for controlling a voltage applied to processor cores of a processor are disclosed. The method includes processing a plurality of tasks on the processor with a plurality of processor cores and applying a rail voltage to the plurality of processor cores. The number of the plurality of processor cores that are active is adjusted, and the rail voltage that is applied to the plurality of processor cores is adjusted based upon the number of the plurality of processor cores that are active.

11 Claims, 4 Drawing Sheets

| Vmin | Number of Active Cores | Frequency Mode |
|---|---|---|
| V1 | 1 | Static Voltage Scaling (SVS) |
| V2 | 1 | Nominal |
| V3 | 1 | Turbo |
| V4 | 2 | Static Voltage Scaling (SVS) |
| V5 | 2 | Nominal |
| V6 | 2 | Turbo |
| V7 | 4 | Static Voltage Scaling (SVS) |
| V8 | 4 | Nominal |
| V9 | 4 | Turbo |

DYNAMIC MULTI-CORE PROCESSOR VOLTAGE SCALING BASED ON ONLINE CORE COUNT

CLAIM OF PRIORITY UNDER 35 U.S.C. § 119

The present Application for Patent claims priority to Provisional Application No. 62/119,716 entitled "DYNAMIC MULTI-CORE PROCESSOR VOLTAGE SCALING BASED ON ONLINE CORE COUNT" filed Feb. 23, 2015 and assigned to the assignee hereof and hereby expressly incorporated by reference herein.

BACKGROUND

Field

The present disclosed embodiments relate generally to computing devices, and more specifically to control of power to processors.

Background

Computing devices including devices such as smartphones, tablet computers, gaming devices, and laptop computers are now ubiquitous. These communication devices are now capable of running a variety of applications (also referred to as "apps") and many of these devices include processors to process tasks that are associated with apps. In many instances, multiple cores are integrated as a collection of processor cores within a single functional subsystem. It is known that the processing load on a mobile device may be apportioned to the multiple cores. As an example, for load balancing purposes, a processing task may be migrated from one core to another core. In many existing devices multiple cores operate at the same frequency; thus a particular task may be migrated from one core to another core without substantially affecting what the user experiences because the task is processed at the same frequency regardless of the core.

In a system with a synchronous multi-core processor, in which all cores are powered by the same voltage supply, it is necessary for the voltage of the supply to be high enough to account for losses (e.g., voltage drops in a power distribution network on the board and in the system on a chip (SoC)) as well as noise so that all cores can operate successfully at the same time. But this voltage may be conservatively kept too high in situations where not all of the cores are active, which leads to unnecessary, additional power consumption.

SUMMARY

According to an aspect, a computing device includes a plurality of processor cores, a power rail coupled to the plurality of processor cores, and a power supply coupled to the power rail to apply a rail voltage to the processor cores via the power rail. An online-core-based voltage controller is coupled to the power supply, and the online-core-based voltage controller is configured to control the voltage applied by the power supply based on a number of the processor cores that are active.

Another aspect includes a method for controlling power that is applied to a processor of a computing device. The method includes processing a plurality of tasks on the computing device with a plurality of processor cores, applying a shared rail voltage to the plurality of processor cores, and adjusting a number of the plurality of processor cores that are active. The shared rail voltage that is applied to the plurality of processor cores is adjusted based upon the number of the plurality of processor cores that are active.

Yet another aspect includes a non-transitory, tangible processor readable storage medium, encoded with processor readable instructions to perform a method for obtaining web content on a computing device. The method includes processing a plurality of tasks on the computing device with a plurality of processor cores, applying a rail voltage to the plurality of processor cores, and adjusting a number of the plurality of processor cores that are active. The rail voltage that is applied to the plurality of processor cores is adjusted based upon the number of the plurality of processor cores that are active.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
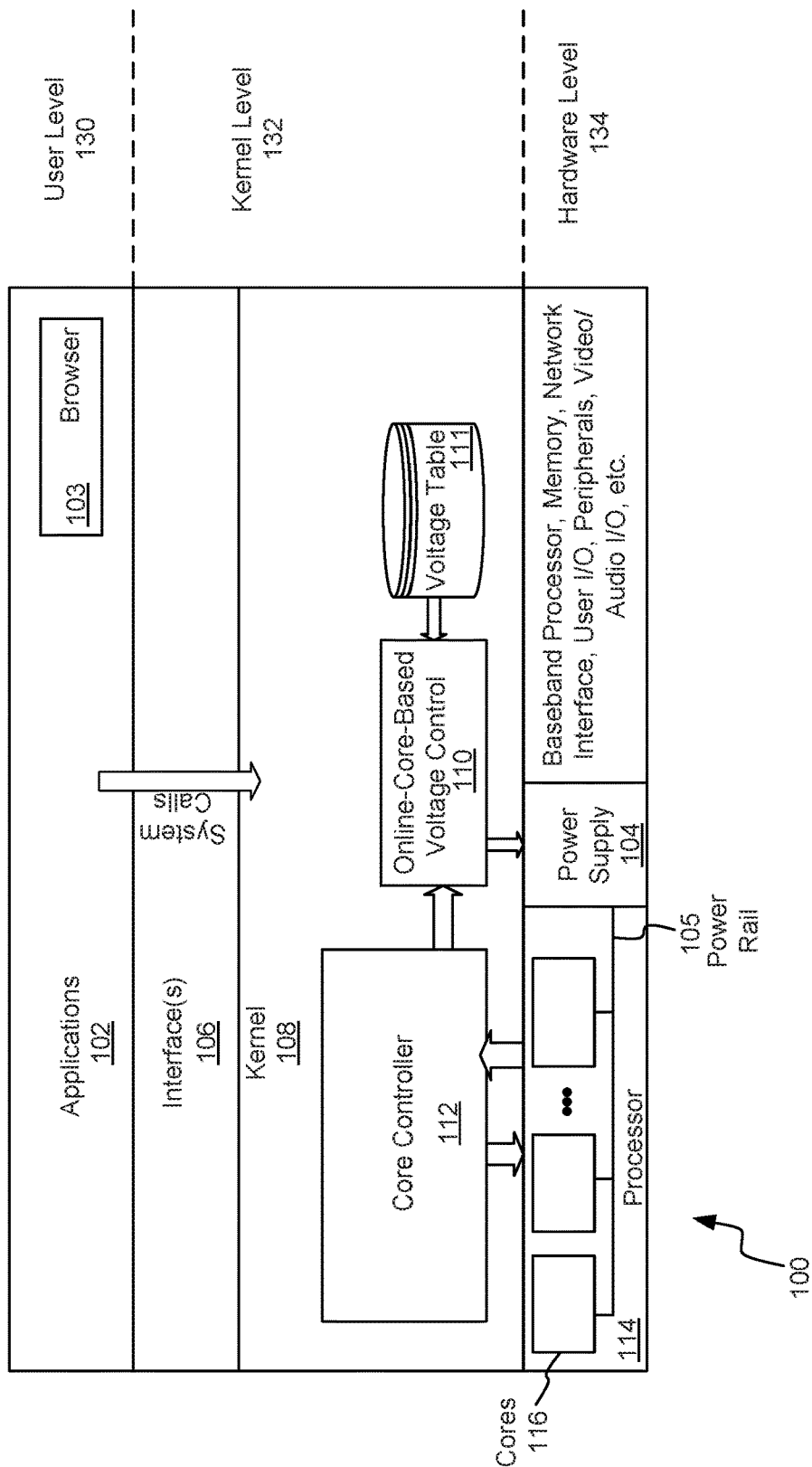
FIG. 1 is a block diagram illustrating components of a computing device.

Referring to FIG. 1, it is a block diagram illustrating components of a computing system 100 (also referred to herein as a computing device 100). The block diagram includes applications 102 (e.g., a web browser 103) at the highest level of abstraction and hardware such as a synchronous multicore processor 114 (e.g., application processor), which includes a plurality of processor cores 116, at the lowest level. As shown, in this embodiment, the processor cores 116 are coupled to a power supply 104 via a shared power rail 105; thus the processor cores 116 in this embodiment share a rail voltage that is the sole voltage applied by the power supply 104.

The kernel 108 along with interface 106 enable communication between the applications 102 and the processor 114. In particular, the interface 106 passes system calls from the applications 102 to the kernel 108. In an embodiment, the kernel 108 is realized by a LINUX kernel that has been modified as discussed further herein. Although the specific embodiment depicted in FIG. 1 depicts multiple processor cores 116 within the processor 114, it should be recognized that other embodiments include a plurality of processors that are not integrated within a processor 114, but share a supply voltage. As a consequence, the operation of multiple processors is described herein in the context of both multiple processor cores 116, and more generally, multiple processors, which may include processor cores and discrete CPUs that share a supply voltage.

The one or more applications 102 may be realized by a variety of applications that operate via, or run on, the processor 114 or another processor (not shown). For example, the one or more applications 102 may include a web browser 103 and associated plug-ins, entertainment applications (e.g., video games, video players), productivity applications (e.g., word processing, spread sheet, publishing applications, video editing, photo editing applications), core applications (e.g., phone, contacts), and augmented reality applications.

As one of ordinary skill in the art will appreciate, the user-space 130 and kernel-space 132 components depicted in FIG. 1 may be realized by hardware in connection with processor-executable code stored in a non-transitory, tangible processor readable medium such as nonvolatile memory, and can be executed by the processor 114. Numerous variations on the embodiments herein disclosed are also possible.

In general, the core controller 112 operates to vary the number of processor cores 116 that are active (also referred to as online) based upon the processing load that the processor 114 is required to process, and as shown, the core controller 112 provides an indication of the number active cores to an online-core-based voltage controller 110. In addition, the core controller 112 may also provide an indication of the current operating frequency of the processor 114. In turn, the online-core-based voltage controller 110 generally operates to control a voltage of the power rail 105 based upon the number of processor cores 116.

In an embodiment, the online-core-based voltage controller 110 may be realized by processor-executable code stored in a non-transitory, tangible processor readable medium such as nonvolatile memory, and can be executed by the processor 114. When the kernel 108 is realized by modifying a LINUX kernel for example, the online-core-based voltage controller 110 may be realized as a software module that is incorporated into the LINUX kernel code and designed to work with the core controller 112 and the power supply 104 via a driver for the power supply 104.

More specifically, the rail voltage of the processor 114 may be lowered, based upon the number of active cores, to reduce power that is applied by the power supply 104. The adjustment amount may be determined by how many processor cores 116 are online in addition to the current frequency of operation of the processor 114. The adjustment may be performed in order to safely remove voltage margin that was included in the worst-case, all-cores-online-voltage to account for power-distribution-network losses and noise.

In some embodiments, the computing device 100 is characterized by a minimum voltage (Vmin) required to maintain a user-experience under various predefined operating conditions (e.g., operating frequency and number of active cores). In the embodiment depicted in FIG. 1, the computing device 100 includes a voltage table 111 that maps a plurality of voltages a combination of an active core value and a frequency.

Figure 2:
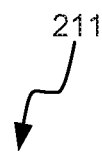
FIG. 2 is a depiction of a voltage table that may be utilized to realize the voltage table depicted in FIG. 1.

Referring briefly to FIG. 2, for example, shown is a voltage table 211 that may be used to realize the voltage table 111 shown in FIG. 1. As shown in FIG. 2, the characterization data produced by characterizing the computing device 100 may be stored in the voltage table 211 for use in connection with the online-core-based voltage controller 110. As shown for example, the voltage table 211 may map each of a plurality of voltage values to a combination of a frequency and an active core value. In this way, when the computing device 100 is in use, a particular voltage (Vmin) may be selected based upon the current number of active cores and current frequency of the processor 114. The voltage table 211 may be created using empirical data that is generated by testing voltages in connection with combinations of operating frequency and active online cores to determine voltage values that are applied by the power supply 104.

Although not required, to generate the characterization data, comprehensive characterization may be performed across thousands of devices from an entire production process spectrum to determine a Vmin required for each target frequency. As shown in FIG. 2, the target frequencies for characterization may be three frequency modes: turbo (a highest frequency); nominal (a typical frequency); and static-voltage-scaling-mode (SVS)(a low voltage/lowest frequency mode). Although the depicted voltage table 211 shows that voltage values V1-V9 are available for 1-core, 2-core, and 4-core modes of operation, this is merely an example, and the number of active cores that may operate at a particular time may vary depending upon the type of processor 114 that is utilized on the computing device 100.

In terms of an actual reduction in rail voltage that may be realized, a particular computing device operating at a particular frequency mode required a Vmin when operating in a dual-core mode of operation that was 60 mV higher than the Vmin required in a quad-core mode of operation. And when operating in a single-core mode, the particular device (operating in the particular frequency mode) required a Vmin that was 80 mV less than Vmin in a quad-core mode of operation.

Figure 3:
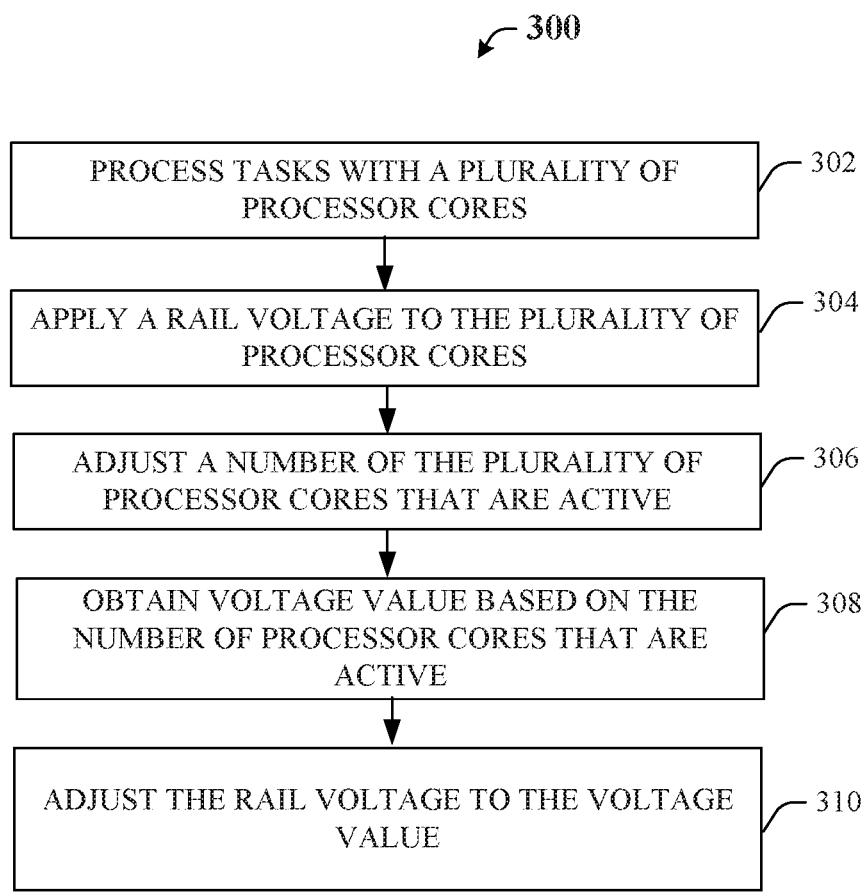
FIG. 3 is a flowchart depicting a method that may be traversed in connection with the computing device depicted in FIG. 1.

Referring next to FIG. 3, shown is a flowchart 300 representing a method that may be traversed in connection with the embodiment described with reference to FIG. 1. As shown, the plurality of processor cores 116 operate to process various tasks in the computing device 100 (Block 302). As one of ordinary skill in the art will appreciate, the tasks may be associated with a variety of different types of executable files including applications 102. As described with reference to FIG. 1, a rail voltage is applied to the processor cores 116 (Block 304). In the embodiment depicted in FIG. 1, the processor cores 116 are synchronously operated so that an operating frequency of all the processor cores 116 is the same, but in many implementations the single operating frequency that is utilized by all of the processor cores 116 may be adjusted to save power while meeting the workload placed on the processor 114.

In addition, a number of the processor cores 116 that are active may be adjusted during operation (Block 306). For example, one or more of the processor cores 116 may be taken offline to save power when the processing load does not demand all of the processor cores 116 to be operating. In response to the number of active processor cores 116 changing, a voltage value for the rail voltage is obtained (Block 308). For example, the voltage value may be obtained from the voltage table 111, 211.

As shown, after the voltage value is obtained, the online-core-based voltage controller 110 adjusts the rail voltage to the voltage value (e.g., one of the voltage values V1-V9 depicted in the voltage table). More specifically, if less than all of the processor cores 116 are active, then the rail voltage may be reduced to save power. As discussed above, the typical rail voltage (established for losses when all the processor cores 116 are online) need not be utilized when only a portion of the processor cores 116 is active.

Figure 4:
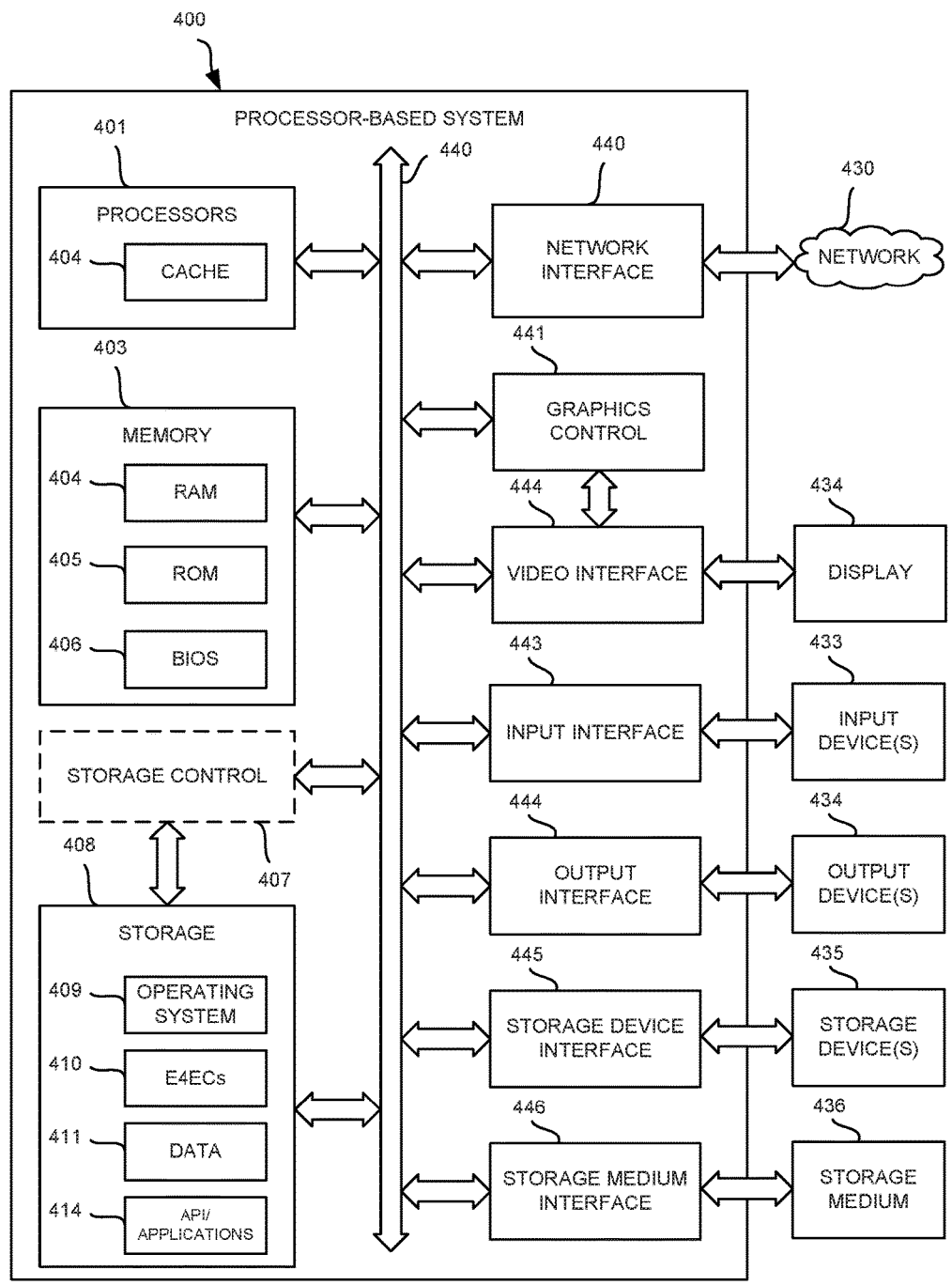
FIG. 4 is a block diagram depicting physical structures that may be utilized in connection with implementing the embodiments disclosed herein.

The systems and methods described herein can be implemented in a machine such as a processor-based system in addition to the specific physical devices described herein. FIG. 4 shows a diagrammatic representation of one embodiment of a machine in the exemplary form of a processor-based system 400 within which a set of instructions can execute for causing a device to perform or execute any one or more of the aspects and/or methodologies of the present disclosure. The components in FIG. 4 are examples only and do not limit the scope of use or functionality of any hardware, software, embedded logic component, or a combination of two or more such components implementing particular embodiments.

Processor-based system 400 may include processors 401, a memory 403, and storage 408 that communicate with each other, and with other components, via a bus 440. The bus 440 may also link a display 432 (e.g., touch screen display), one or more input devices 433 (which may, for example, include a keypad, a keyboard, a mouse, a stylus, etc.), one or more output devices 434, one or more storage devices 435, and various tangible storage media 436. All of these elements may interface directly or via one or more interfaces or adaptors to the bus 440. For instance, the various non-transitory tangible storage media 436 can interface with the bus 440 via storage medium interface 426. Processor-based system 400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processors 401 (or central processing unit(s) (CPU(s))) optionally contain a cache memory unit 402 for temporary local storage of instructions, data, or computer addresses. Processor(s) 401 are configured to assist in execution of processor-executable instructions. Processor-based system 400 may provide functionality as a result of the processor(s) 401 executing software embodied in one or more tangible processor-readable storage media, such as memory 403, storage 408, storage devices 435, and/or storage medium 436. The processor-readable media may store software that implements particular embodiments, and processor(s) 401 may execute the software. Memory 403 may read the software from one or more other processor-readable media (such as mass storage device(s) 435, 436) or from one or more other sources through a suitable interface, such as network interface 420. The software may cause processor(s) 401 to carry out one or more processes or one or more steps of one or more processes described or illustrated herein. Carrying out such processes or steps may include defining data structures stored in memory 403 and modifying the data structures as directed by the software.

The memory 403 may include various components (e.g., machine readable media) including, but not limited to, a random access memory component (e.g., RAM 404) (e.g., a static RAM "SRAM", a dynamic RAM "DRAM, etc.), a read-only component (e.g., ROM 405), and any combinations thereof. ROM 405 may act to communicate data and instructions unidirectionally to processor(s) 401, and RAM 404 may act to communicate data and instructions bidirectionally with processor(s) 401. ROM 405 and RAM 404 may include any suitable tangible processor-readable media described below. In one example, a basic input/output system 406 (BIOS), including basic routines that help to transfer information between elements within processor-based system 400, such as during start-up, may be stored in the memory 403.

Fixed storage 408 is connected bidirectionally to processor(s) 401, optionally through storage control unit 407. Fixed storage 408 provides additional data storage capacity and may also include any suitable tangible processor-readable media described herein. Storage 408 may be used to store operating system 409, EXECs 410 (executables), data 411, applications 412 (application programs), and the like. Often, although not always, storage 408 is a secondary storage medium (such as a hard disk) that is slower than primary storage (e.g., memory 403). Storage 408 can also include an optical disk drive, a solid-state memory device (e.g., flash-based systems), or a combination of any of the above. Information in storage 408 may, in appropriate cases, be incorporated as virtual memory in memory 403.

In one example, storage device(s) 435 may be removably interfaced with processor-based system 400 (e.g., via an external port connector (not shown)) via a storage device interface 425. Particularly, storage device(s) 435 and an associated machine-readable medium may provide nonvolatile and/or volatile storage of machine-readable instructions, data structures, program modules, and/or other data for the processor-based system 400. In one example, software may reside, completely or partially, within a machine-readable medium on storage device(s) 435. In another example, software may reside, completely or partially, within processor(s) 401.

Bus 440 connects a wide variety of subsystems. Herein, reference to a bus may encompass one or more digital signal lines serving a common function, where appropriate. Bus 440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Processor-based system 400 may also include an input device 433. In one example, a user of processor-based system 400 may enter commands and/or other information into processor-based system 400 via input device(s) 433. Examples of an input device(s) 433 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 433 may be interfaced to bus 440 via any of a variety of input interfaces 423 (e.g., input interface 423) including, but not limited to, serial, parallel, game port, universal serial bus (USB), FIREWIRE, THUNDERBOLT, or any combination of the above.

In particular embodiments, when processor-based system 400 is connected to network 430, processor-based system 400 may communicate with other devices, specifically mobile devices and enterprise systems, connected to network 430. Communications to and from processor-based system 400 may be sent through network interface 420. For example, network interface 420 may receive incoming communications (such as requests or responses from other devices) in the form of one or more packets (such as Internet Protocol (IP) packets) from network 430, and processor-based system 400 may store the incoming communications in memory 203 for processing. Processor-based system 400 may similarly store outgoing communications (such as requests or responses to other devices) in the form of one or more packets in memory 403 and communicated to network 430 from network interface 420. Processor(s) 401 may access these communication packets stored in memory 403 for processing.

Examples of the network interface 420 include, but are not limited to, a network interface card, a modem, and any combination thereof. Examples of a network 430 or network segment 430 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 230, may employ a wired and/or a wireless mode of communication. In general, any network topology may be used.

Information and data can be displayed through a display 432. Examples of a display 422 include, but are not limited to, a liquid crystal display (LCD), an organic light emitting diode (OLED) display, a cathode ray tube (CRT), a plasma display, and any combinations thereof. The display 432 can interface to the processor(s) 401, memory 403, and fixed storage 408, as well as other devices, such as input device(s) 433, via the bus 440. The display 432 is linked to the bus 440 via a video interface 422, and transport of data between the display 432 and the bus 440 can be controlled via the graphics control 421.

In addition to a display 432, processor-based system 400 may include one or more other peripheral output devices 434 including, but not limited to, an audio speaker, a printer, and any combinations thereof. Such peripheral output devices may be connected to the bus 440 via an output interface 424. Examples of an output interface 424 include, but are not limited to, a serial port, a parallel connection, a USB port, a FIREWIRE port, a THUNDERBOLT port, and any combinations thereof.

In addition or as an alternative, processor-based system 400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a processor-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, or hardware in connection with software. Various illustrative components, blocks, modules, circuits, and steps have been described above generally in terms of their functionality. Whether such functionality is implemented as hardware or hardware that utilizes software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read-only memory (EPROM), electrically erasable programmable read-only memory (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A computing device comprising:
a plurality of processor cores:
a power rail coupled to the plurality of processor cores;
a power supply coupled to the power rail to apply a rail voltage to the processor cores via the power rail;
a kernel configured to communicate with the plurality of processor cores, the power supply, and applications of the computing device, the kernel is configured to receive system calls from the applications, and the kernel includes:
a core controller configured to first control a frequency of the processor cores and a number of processor cores that are online based upon a processing load that is placed on the plurality of processor cores by tasks associated with the applications;
an online-core-based voltage controller configured to receive, from the core controller, both an indication of the number of processor cores that are online and a frequency of the processor cores, and the online-core-based voltage controller is configured to control, via a driver of the kernel, and after the core controller controls the frequency of the processor cores, the rail voltage applied by the power supply based on the number of processor cores that are online and the frequency of the processor cores; and a voltage table that maps each of an active core value to one of a turbo frequency mode, a nominal frequency mode, or a static-voltage-scaling frequency mode, wherein each frequency mode is mapped to a corresponding one of a plurality of minimum voltage values;

wherein the online-core-based voltage controller is configured to:

obtain a particular minimum voltage value from the voltage table based on the number of processor cores that are online and the frequency mode of the processor cores; and adjust the rail voltage to the particular minimum voltage value.

2. The computing device of claim 1, wherein all of the plurality of processor cores operate at a same frequency and at a same voltage.

3. The computing device of claim 1, wherein the power rail is a sole power rail applying power to the plurality of processor cores and the rail voltage is a sole voltage applied to the plurality of processor cores.

4. The computing device of claim 1, wherein characterization data of the computing device provides the minimum voltage values stored in the voltage table.

5. The computing device of claim 4, wherein the characterization data is obtained from characterization tests across a plurality of identical computing devices to the computing device.

6. A method for controlling power that is applied to a processor of a computing device, the method comprising:

receiving system calls at a kernel of the computing device from applications on the computing device;

processing a plurality of tasks associated with the applications on the computing device with a plurality of processor cores;

applying a rail voltage to the plurality of processor cores with a power supply of the computing device;

adjusting first, with a core controller of the kernel, a frequency of the plurality of processor cores and a number of the plurality of processor cores that are active based upon a processing load that is placed on the plurality of processor cores by the plurality of tasks;

adjusting, via a driver of the kernel, and after the core controller adjusts the frequency of the plurality of processor cores, with an online-core-based voltage controller of the kernel, the rail voltage that is applied by the power supply to the plurality of processor cores based upon the frequency and the number of the plurality of processor cores that are active;

obtaining a particular minimum voltage value from a voltage table that maps each of an active core value to one of a turbo frequency mode, a nominal frequency mode, or a static-voltage scaling frequency mode, wherein each frequency mode is mapped to a corresponding one of a plurality of minimum voltage values;

setting an all-cores-online-voltage to a value to provide a minimum voltage to the processor cores, plus a margin, based upon losses and noise; and adjusting the rail voltage to the particular minimum voltage value wherein the rail voltage is set to a value that is less than the all-cores-online-voltage value when less than all of the processor cores are active.

7. The method of claim 6, wherein the number of the plurality of processor cores that are active is adjusted based upon a processing load that is placed on the plurality of processor cores.

8. The method of claim 6, further comprising:

providing characterization data comprising the minimum voltage values stored in the voltage table.

9. The method of claim 8, further comprising:

generating the characterization data by performing characterization tests across a plurality of identical computing devices to the computing device.

10. A non-transitory, tangible processor readable storage medium, encoded with processor readable instructions to perform a method for controlling power that is applied to a processor on a computing device, the method comprising:

receiving system calls at a kernel of the computing device from applications on the computing device;

processing a plurality of tasks associated with the applications on the computing device with a plurality of processor cores;

applying a rail voltage to the plurality of processor cores with a power supply of the computing device;

adjusting first, with a core controller of the kernel, a frequency of the plurality of processor cores and a number of the plurality of processor cores that are active based upon a processing load that is placed on the plurality of processor cores by the plurality of tasks;

adjusting, via a driver of the kernel, and after the core controller adjusts the frequency of the plurality of processor cores, with an online-core-based voltage controller of the kernel, the rail voltage that is applied by the power supply to the plurality of processor cores based upon the frequency and the number of the plurality of processor cores that are active obtaining a particular minimum voltage value from a voltage table that maps each of an active core value to one of a turbo frequency mode, a nominal frequency mode, or a static-voltage-scaling frequency mode wherein each frequency mode is mapped to a corresponding one of a plurality of minimum voltage values;

setting an all-cores-online-voltage to a value to provide a minimum voltage to the processor cores, plus a margin, based upon losses and noise; and adjusting the rail voltage to the particular minimum voltage value wherein the rail voltage is set to a value that is less than the all-cores-online-voltage value when less than all of the processor cores are active.

11. The non-transitory, tangible processor readable storage medium of claim 10, wherein the number of the plurality of processor cores that are active is adjusted based upon a processing load that is placed on the plurality of processor cores.

* * * * *